United States Patent
Wu et al.

(10) Patent No.: US 10,961,375 B1
(45) Date of Patent: Mar. 30, 2021

(54) ETHYLENE VINYL ALCOHOL COPOLYMER RESIN COMPOSITION AS WELL AS FILMS AND MULTI-LAYER STRUCTURES THEREOF

(71) Applicant: CHANG CHUN PETROCHEMICAL CO., LTD., Taipei (TW)

(72) Inventors: Hou Hsi Wu, Taipei (TW); Yu Hsiu Li, Taipei (TW)

(73) Assignee: CHANG CHUN PETROCHEMICAL CO., LTD., Taipei (TW)

(*) Notice: Subject to any disclaimer, the term of this patent is extended or adjusted under 35 U.S.C. 154(b) by 0 days.

(21) Appl. No.: 16/877,570

(22) Filed: May 19, 2020

Related U.S. Application Data

(63) Continuation-in-part of application No. 16/729,984, filed on Dec. 30, 2019, now Pat. No. 10,711,124.

(51) Int. Cl.
| | |
|---|---|
| C08L 23/08 | (2006.01) |
| C08L 29/04 | (2006.01) |
| C08L 27/12 | (2006.01) |
| C08J 3/12 | (2006.01) |
| C08K 3/38 | (2006.01) |
| B32B 27/08 | (2006.01) |
| B32B 7/12 | (2006.01) |

(52) U.S. Cl.
CPC .............. *C08L 23/08* (2013.01); *B32B 7/12* (2013.01); *B32B 27/08* (2013.01); *C08K 3/38* (2013.01); *C08L 29/04* (2013.01); *B32B 2323/046* (2013.01); *B32B 2323/10* (2013.01); *B32B 2329/04* (2013.01); *B32B 2377/00* (2013.01); *C08K 2003/387* (2013.01); *C08K 2201/003* (2013.01); *C08L 2203/16* (2013.01)

(58) Field of Classification Search
CPC .......... C08L 23/08; C08L 27/12; C08L 29/04; C08L 2203/16; C08L 2205/14; C08J 3/12
See application file for complete search history.

(56) References Cited

U.S. PATENT DOCUMENTS

| | | | |
|---|---|---|---|
| 5,460,760 | A | 10/1995 | Tsai et al. |
| 10,711,124 | B1 * | 7/2020 | Wu .................. C08L 23/08 |
| 2003/0096101 | A1 | 5/2003 | Kazeto |
| 2006/0121270 | A1 | 6/2006 | Kazeto |
| 2008/0199645 | A1 | 8/2008 | Julien |
| 2009/0020914 | A1 | 1/2009 | Nelson et al. |
| 2009/0098395 | A1 | 4/2009 | Lu |
| 2009/0274917 | A1 | 11/2009 | Kazeto |
| 2015/0140247 | A1 | 5/2015 | Shibutani et al. |
| 2019/0345309 | A1 | 11/2019 | Okamoto et al. |
| 2020/0143098 | A1 | 5/2020 | Corliss et al. |

FOREIGN PATENT DOCUMENTS

| | | | |
|---|---|---|---|
| CN | 104513444 | A | 4/2015 |
| CN | 102574382 | B | 9/2015 |
| CN | 108779258 | A | 11/2018 |
| JP | H0995583 | A | 4/1997 |
| JP | 2000001593 | A | 1/2000 |
| JP | 2001081262 | A | 3/2001 |
| JP | 2005239902 | A | 9/2005 |
| JP | 2006097033 | A | 4/2006 |
| JP | 2006282835 | A | 10/2006 |
| JP | 2006328195 | A | 12/2006 |
| JP | 2008308657 | A | 12/2008 |
| JP | 2011183814 | A | 9/2011 |
| JP | 4832783 | B2 | 12/2011 |
| JP | 2016084158 | A | 5/2016 |
| JP | 2017088666 | A | 5/2017 |
| WO | WO-2010/045152 | A2 | 4/2010 |
| WO | 2015021198 | A1 | 2/2015 |

OTHER PUBLICATIONS

U.S. Appl. No. 16/877,555, filed May 19, 2020.

* cited by examiner

Primary Examiner — Robert D Harlan
(74) Attorney, Agent, or Firm — Polsinelli PC (57) ABSTRACT

The instant disclosure relates to ethylene vinyl alcohol copolymer resin composition and/or pellets thereof including one or more fluorine-containing micro-particles. The ethylene vinyl alcohol copolymer resin composition and/or pellets thereof may have a boron content of 10 to 450 ppm. EVOH films formed from the EVOH may have a Charpy impact strength of at least 2.5 KJ/m² according to ISO 179-1 at 23° C. and an elongation at break of at least 18.2% according to ISO 527-2 at 23° C.

13 Claims, 3 Drawing Sheets

ETHYLENE VINYL ALCOHOL COPOLYMER RESIN COMPOSITION AS WELL AS FILMS AND MULTI-LAYER STRUCTURES THEREOF

CROSS-REFERENCE TO RELATED APPLICATIONS

This application claims priority to and is a continuation in part of U.S. patent application Ser. No. 16/729,984, filed on Dec. 30, 2019, entitled "ETHYLENE VINYL ALCOHOL PELLETS AS WELL AS FILMS THEREOF," the entirety of which is herein incorporated by reference.

FIELD OF THE DISCLOSURE

The instant disclosure relates to ethylene vinyl alcohol copolymer ("EVOH") resin composition and pellets thereof. The ethylene vinyl alcohol copolymer resin composition have micro-particles and, in particular, fluorine-containing micro-particles. The EVOH resin composition may have a boron content of 10 to 450 ppm. Films and multi-layer structures formed from the ethylene vinyl alcohol copolymer resin composition and/or pellets are also disclosed herein.

BACKGROUND OF THE DISCLOSURE

EVOH resins are widely used in laminates for preserving perishable items. For example, EVOH resins and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

The poor uniformity of film thickness is a common problem with EVOH films, which may reduce the gas barrier properties and mechanical properties of such EVOH films. Moreover, the flexibility and mechanical properties of typical EVOH films are insufficient for the wider application and practical use of EVOH films. These issues have not be sufficiently addressed or solved with convention technology.

Thus, there is a continued need for EVOH resins that provide better film flexibility, mechanical properties, and uniformity of film thickness.

SUMMARY OF THE INVENTION

Aspects of the disclosure are directed to ethylene vinyl alcohol copolymer ("EVOH") resin composition having micro-particles and, in particular, fluorine-containing micro-particles. The EVOH resin composition may in the form of pellet(s), film(s), fiber(s), and/or the like. The EVOH resin composition may be used to produce films or multi-layer structures. It has been conventional wisdom to avoid combining EVOH and fluorinated polymers because of their immiscibility. For example, the immiscibility of EVOH and fluorinated polymers was expected to adversely affect the appearance and the mechanical properties of films formed therefrom.

While the combination of EVOH and fluorinated polymers (referred herein also as "fluoropolymers") has been traditionally avoided due to problems arising from immiscibility, aspects of the disclose utilize fluoropolymers that are partially miscible (and partially immiscible) to produce EVOH resin composition having improved precipitation at the die and reduced screw sticking problems. Additionally, it was discovered that the EVOH resin composition disclosed herein may provide improved flexibility and increased mechanical properties to films and multi-layer structures formed therefrom. Specifically, by utilizing EVOH resin composition having fluorine-containing micro-particles, the inventors realized that EVOH films could be obtained having improved strength (e.g., as measured by Charpy impact testing) and improved flexibility (e.g., as measured by elongation at breakage).

In additional aspects of the disclosure, provided are EVOH resin composition (or pellets thereof) having fluorine-containing micro-particles and a boron content of 10 to 450 ppm. In some cases, a typical EVOH resin composition may comprise an ethylene-vinyl alcohol copolymer; one or more fluorine-containing micro-particles; and a boron compound, where the ethylene-vinyl alcohol copolymer resin composition has a boron content of 10 to 450 ppm. Without being limited to any specific theory, it is believed that the addition of a boron compound in EVOH resin composition having fluorine-containing micro-particles, such that the boron content of the EVOH resin composition is from 10 to 450 ppm, reduces or eliminates the sticking of the EVOH resin composition during extrusion through a screw extruder. It was surprisingly discovered that the boron content under certain range can further improve the film thickness uniformity and also improve the flexibility. In some instances, such EVOH resin compositions may clean the screw extruder during the extrusion process by removing or at least partially removing EVOH resin previously stuck to the inner surfaces of the screw extruder.

The EVOH resin composition may also include one or more fluorine-containing micro-particles comprising a fluorinated polymer. Preferably, the fluorine-containing micro-particles each have a particle size with a diameter or a length of the major axis that is not greater than 20 μm. In some cases, the fluorine-containing micro-particles each have a particle size with a diameter or a length of the major axis that is 0.5 to about 19 μm. The fluorine-containing micro-particles may comprise about 1.5 to about 48 wt. % of fluorine, based on the total weight of carbon, oxygen, and fluorine elements. It was surprisingly discovered that the micro-particles size under certain ranges can further improve the film appearance and precipitation at die.

In a non-limiting example, the EVOH resin composition has at least two melting point temperatures—in other words, at least a first melting point temperature and a second melting point temperature. The first melting point temperature may be from about 100° C. to about 140° C. or from 105° C. to 135° C. The second melting point temperature may be from about 150° C. to about 195° C. or from 158° C. to 190° C.

Additionally or alternatively, the ethylene-vinyl alcohol copolymer of the EVOH resin composition may have a degree of saponification of 99.5 mole % or more. The ethylene-vinyl alcohol copolymer may have an ethylene content of about 20 to about 50 mole %. For example, the ethylene content of the ethylene-vinyl alcohol copolymer may be about 25 to about 45 mole %. In some instances, the EVOH resin composition are free of polyalkyleneoxides.

Preferably, the fluorine-containing micro-particles of the EVOH resin composition may have a particle size about 0.5 to about 19 μm. For instance, the particle size of fluorine-containing micro-particles may be about 1.2 to about 16 μm.

According to at least one embodiment, the EVOH resin composition comprise:
- an ethylene-vinyl alcohol copolymer comprising an ethylene content of about 20 to about 50 mole % and having a degree of saponification of 99.5 mole % or more;
- at least two melting point temperatures, a first melting point temperature of about 100° C. to about 140° C. and a second melting point temperature of about 150° C. to about 195° C.;
- fluorine-containing micro-particle dispersed in the EVOH resin composition; and
- a boron content of 10 to 450 ppm.

Films formed from the EVOH resin composition typically have a Charpy impact strength of at least 2.5 KJ/m² (for example, according to ISO 179-1 at 23° C.) and an elongation breakage percentage of at least 18.2% (according to ISO 527-2 at 23° C.). Preferably, the film has a Charpy impact strength of at least 2.6 KJ/m². In some cases, the film may have an elongation breakage percentage of at least 20%. It was surprising that EVOH resin composition having the fluorine-containing micro-particles described herein would provide such advantageous improvements in the strength and flexibility of films formed from such EVOH resin composition pellets.

BRIEF DESCRIPTION OF THE FIGURES

Implementation of the present technology will now be described, by way of example only, with reference to the attached figures, wherein.

It should be understood that the various aspects are not limited to the arrangements, instrumentality, and characteristics shown in the drawings.

DETAILED DESCRIPTION OF THE DISCLOSURE

Aspects of the disclosure are directed to ethylene vinyl alcohol copolymer ("EVOH") resin composition(s). The EVOH resin composition have micro-particles, particularly fluorine-containing micro-particles, dispersed therein. The EVOH resin compositions may be used to produce films or multi-layer structures.

In accordance with one aspect of the disclosure, provided is EVOH resin composition. The EVOH resin composition can be in the form of pellet(s), film(s), fiber(s), and/or the like. As used herein, EVOH pellet(s) refer to an EVOH resin composition that has been pelletized to be in the form and/or shape of one or more pellets. Although an EVOH resin composition pelletized to be in the form of one or more EVOH pellet(s) is described throughout the instant disclosure, the EVOH resin composition may be processed to be in the form of beads, cubes, chips, shavings, or the like. The EVOH resin composition of the instant disclosure typically include an ethylene-vinyl alcohol copolymer and one or more fluorine-containing micro-particle(s) having a particle size that is not greater than 20 μm.

Figure 1:
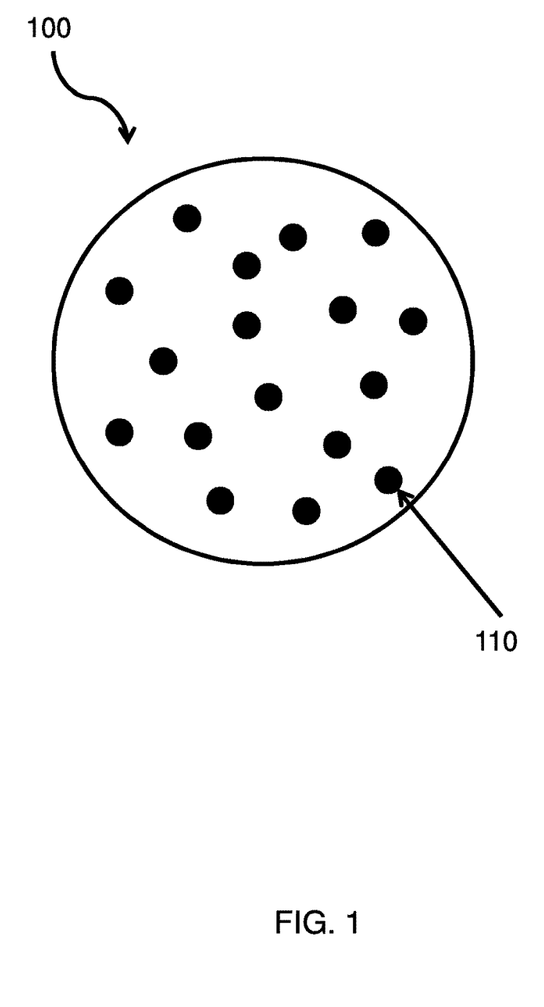
FIG. 1 is a cross-sectional depiction of an exemplary EVOH resin composition in accordance with aspects of the disclosure.

FIG. 1 depicts a cross-section of an exemplary EVOH resin composition 100 in accordance with aspects of the disclosure. EVOH resin composition 100 is formed from an EVOH having an ethylene content. For example, the EVOH may have an ethylene content of about 20 to about 50 mole %, about 25 to about 45 mole %, about 28 to about 42 mole %, or about 30 to about 40 mole %. EVOH resin composition 100 may be formed of two or more EVOH having different ethylene contents. For example, one of the EVOH may have an ethylene content in the range of about 20 to about 35 mole %, such as about 24 to about 35 mole %, about 28 to about 35 mole %; from about 20 to about 32 mole %, about 24 to about 32 mole %, about 28 to about 32 mole %; from about 20 to about 30 mole %, or about 24 to about 30 mole %. Additionally or alternatively, one of EVOH may have an ethylene content in the range of about 36 to about 50 mole %, such as about 40 to about 50 mole %, about 44 to about 50 mole %; from about 36 to about 45 mole %, or about 40 to about 45 mole %. In some preferred instances, however, EVOH resin composition 100 is formed from a single EVOH having an ethylene content of about 20 to about 50 mole %.

EVOH resin composition 100 has an amount of fluorine associated with the incorporation of one or more fluorinated polymer (also referred to herein as "fluoropolymer"), which can form fluorine-containing micro-particles 110 dispersed in the EVOH resin composition 100. For example, the one or more fluoropolymers may include or be chosen from polyvinylidene fluoride ("PVDF"), polytetrafluoroethylene, polyhexafluoropropylene, polychlorotrifluoroethylene, 2-chloropentafluoropropene, dichlorodifluoroethylene, 1,1-dichlorofluoroethylene, and/or combinations thereof. Additionally or alternatively, the fluoropolymer may include copolymers derived from at least one of vinylidene fluoride ("VDF"), hexafluoropropylene ("HFP"), and tetrafluoroethylene ("TFE"). In some instances, the fluoropolymer may include copolymers derived from two or more of VDF, HFP, and TFE. For example, EVOH resin composition 100 may include a copolymer derived from VDF and HFP, a copolymer derived from TFE and HFP, a copolymer derived from VDF and TFE, and/or a copolymer derived from VDF, HFP, and TFE. While not being limited to any specific theory, the inventors believe that the fluoropolymers can reduce at least one of the melting points of the EVOH resin composition 100 by producing a reduction in the crystalline size, which reduces energy requirements during processing.

The fluorine-containing micro-particles 110 may have about 1.5 to about 48 weight percent (wt. %) of fluorine, based on the total weight of carbon, oxygen, and fluorine elements of the fluorine-containing micro-particles 110. The fluorine-containing micro-particles 110 may in further instances have about 1.5 to about 47 wt % of fluorine or about 1.8 to about 44 wt. % of fluorine or about 2.1 to about 41 wt. % of fluorine, based on the total weight of carbon, oxygen, and fluorine elements of the fluorine-containing micro-particles 110.

The fluorine-containing micro-particles 110 of EVOH resin composition 100 may have a particle size with a diameter or a length of the major axis across a cross-sectional area of 0.3 to about 19 μm, 0.3 to about 18 μm, 0.5 to about 19 μm, 1.0 to about 19 μm or, preferably, 1.2 to about 16 μm. The size of the fluorine-containing micro-particles may be controlled by controlling the type or species of fluoropolymer, the amount of fluoropolymer, and the ethylene content of the EVOH copolymer. If the fluorine-containing micro-particle is a sphere, the diameter of a cross-sectional area of the fluorine-containing micro-particle is used to determine if the fluorine-containing micro-particle has a desirable particle size. In a case where the fluorine-containing micro-particle is not a sphere and/or the cross section of fluorine-containing micro-particle has a shape other than a circle, such as an ellipse or agglomeration, the length of the major axis of a cross-sectional area of the fluorine-containing micro-particle is used to determine if the fluorine-containing micro-particle has a desirable particle size. The definition of the major axis is the axis with the largest length. In some instances, all of the fluorine-containing micro-particles 110, as assessed over a cross section of an EVOH resin composition 100, have a particle size of not greater than 20 µm, such as not greater than 19 µm, not greater than 18 µm, not greater than 16 µm, not greater than 14 µm, or not greater than 12 µm. In other words, in some instances, none of the fluorine-containing micro-particles 110 have a particle size of greater than 20 µm, such as greater than 19 µm, greater than 18 µm, greater than 16 µm, greater than 14 µm, or greater than 12 µm. The fluorine-containing micro-particles 110 may have a particle size of 0.1 µm or more, 0.3 µm or more, 0.5 µm or more, or 0.7 µm or more. For example, EVOH resin composition 100 may have fluorine-containing micro-particles 110 with a particle size of 1.0 to about 19 µm or 1.2 to about 16 µm. In some instances, all of fluorine-containing micro-particles 110, as assessed over a cross section of an EVOH resin composition 100, are within the desired particle ranges discussed herein. In some cases, however, a majority of fluorine-containing micro-particles 110, as assessed over a cross section of an EVOH resin composition 100, are within the desired particle ranges. Exemplary procedures for determining the particle size within the desired range may include: (a) the amount of fluoropolymer, (b) the ethylene content of EVOH, (c) the type of fluoropolymer (d) the temperature in extruder and (e) the rotational frequency of screw.

Figure 2:
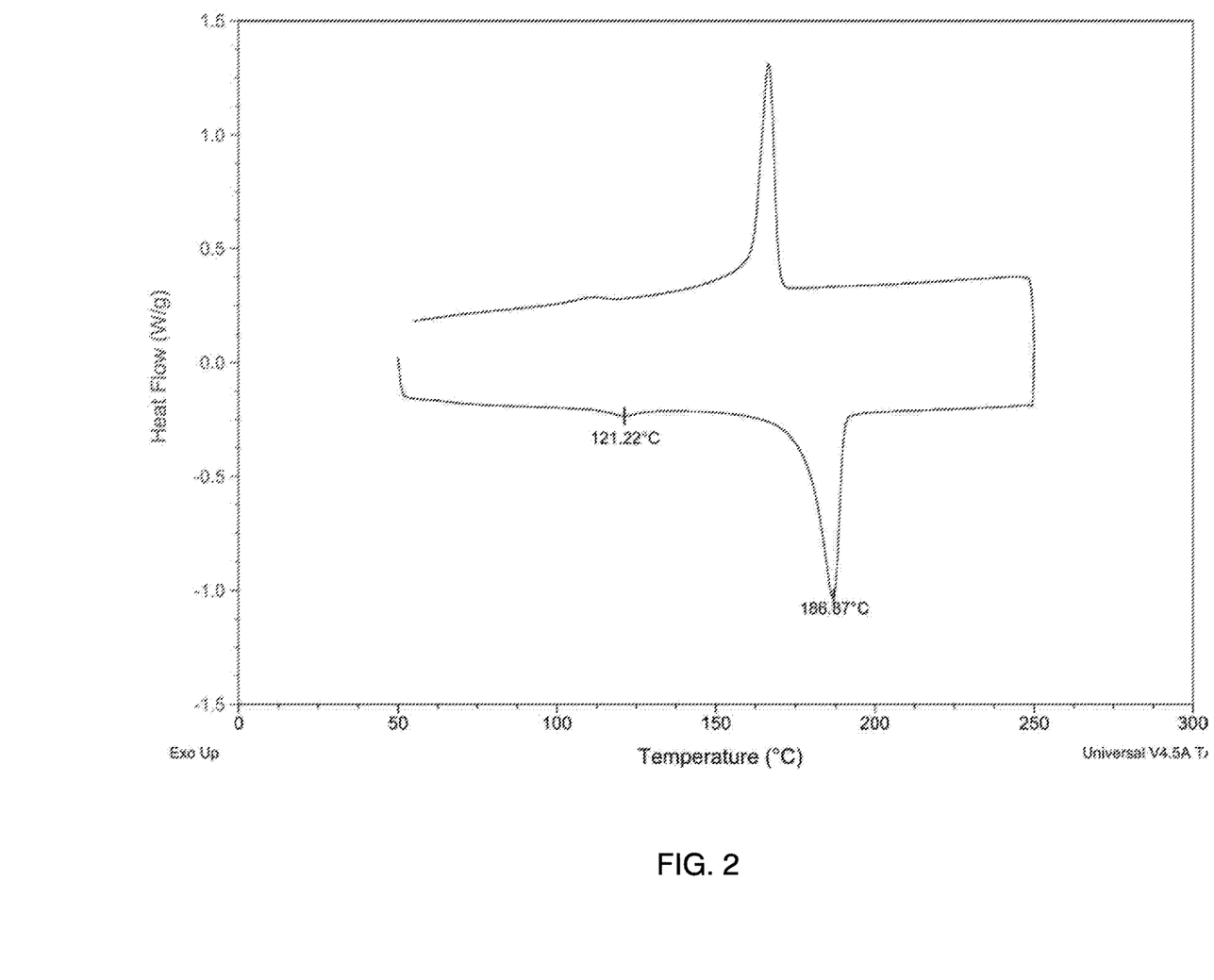
FIG. 2 is a graph of the two melting point temperatures of an exemplary EVOH resin composition according to aspects of the disclosure.

As illustrated by FIG. 2, EVOH resin composition 100 may have at least two melting point temperatures. In some instances, one (e.g., a first) of the melting point temperatures of EVOH resin composition 100 is from about 100° C. to about 140° C.—e.g., from about 105° C. to about 135° C., about 110° C. to about 135° C., or about 120° C. to about 130° C. Additionally or alternatively, one (e.g., a second) of the melting point temperatures may be from about 150° C. to about 195° C.—e.g., about 158° C. to about 190° C. or about 164° C. to about 187° C. In some instances, EVOH resin composition 100 has at least three different melting point temperatures. In other instances, EVOH resin composition 100 includes at least four, at least five, or at least six different melting point temperatures. Additionally and/or alternatively, EVOH resin composition 100 may have a degree of saponification of 90 mole % or more, preferably 95 mole % or more, preferably 97 mole % or more, preferably is 99.5 mole % or more.

The EVOH resin composition 100 thereof may be free of or substantially free of polyalkyleneoxides. For example, EVOH resin composition 100 may have less than 5 wt. %, such as less than 4 wt. %, less than 3 wt. %, less than 2 wt. %, less than 1 wt. %, or less than 0.5 wt. % of polyalkyleneoxides.

Figure 3:
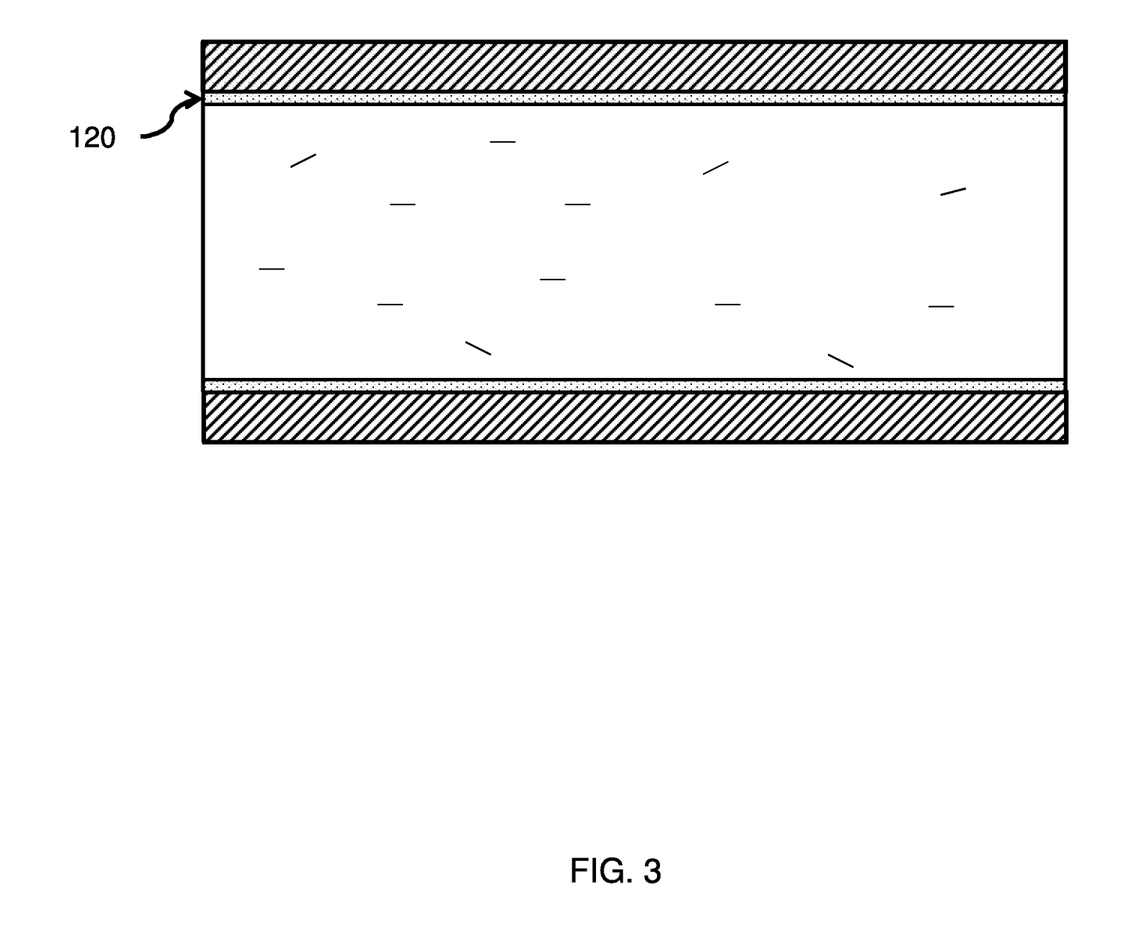
FIG. 3 is a cross-sectional depiction of an extruder with melted EVOH resin compositions according to aspects of the disclosure flowing therethrough.

EVOH resin composition 100 advantageously enables more efficient manufacture of EVOH films formed therefrom. For example, EVOH resin composition 100 may improve precipitation at the die and reduce screw sticking problems during manufacture of EVOH films. Suitable processes and equipment for the manufacture of EVOH films may include those readily known by one of ordinary skill in the art. By utilizing fluoropolymers that are partially miscible (and partially immiscible) and producing EVOH resin composition 100 containing fluorine-containing micro-particle(s) 110, the inventors believe that a portion of the fluoropolymers segregates and forms a coating layer 120 on the inner surface of the extruder. FIG. 3 depicts the formation of a coating layer 120 on the inner surface of an extruder by a portion of the fluoropolymers of an EVOH pellet disclosed herein. Additionally, the EVOH pellets may advantageously enable the extrusion process to occur at increased temperatures without discoloring the produced EVOH film, as the layer of fluorinated polymer coating the extruder inner wall may protect the EVOH resin flowing through the extruder.

By adding the fluoropolymer, it can help EVOH resin composition during the screw processing. In particular, the fluoropolymer attaches to the inner wall of the screw extruder, which reduces the flow resistance of the EVOH resin composition through the screw extruder reducing the die precipitation happened.

A typical EVOH resin composition may comprise an ethylene-vinyl alcohol copolymer, and one or more fluorine-containing micro-particles, wherein the ethylene-vinyl alcohol copolymer resin composition has a melting pressure of 1.7 to 7.0 MPa at a shear rate of 20 s$^{-1}$ and a temperature of 190° C. The melting pressure of the EVOH resin composition may range from 1.7 to 7.0 MPa, 1.7 to about 6.8 MPa, 1.7 to about 6.5 MPa, 1.7 to about 6.2 MPa, 1.7 to about 5.9 MPa, 1.7 to about 5.6 MPa; about 2 to about 6.8 MPa, about 2 to about 6.5 MPa, about 2 to about 6.2 MPa, about 2 to about 5.9 MPa, about 2 to about 5.6 MPa; about 2.3 to about 6.8 MPa, about 2.3 to about 6.5 MPa, about 2.3 to about 6.2 MPa, about 2.3 to about 5.9 MPa, about 2.3 to about 5.6 MPa; about 2.6 to about 6.8 MPa, about 2.6 to about 6.5 MPa, about 2.6 to about 6.2 MPa, about 2.6 to about 5.9 MPa, about 2.6 to about 5.6 MPa; about 2.9 to about 6.8 MPa, about 2.9 to about 6.5 MPa, about 2.9 to about 6.2 MPa, about 2.9 to about 5.9 MPa, about 2.9 to about 5.6 MPa; about 3.2 to about 6.8 MPa, about 3.2 to about 6.5 MPa, about 3.2 to about 6.2 MPa, about 3.2 to about 5.9 MPa, about 3.2 to about 5.6 MPa; about 3.5 to about 6.8 MPa, about 3.5 to about 6.5 MPa, about 3.5 to about 6.2 MPa, about 3.5 to about 5.9 MPa, about 3.5 to about 5.6 MPa; about 3.9 to about 6.8 MPa, about 3.9 to about 6.5 MPa, about 3.9 to about 6.2 MPa, about 3.9 to about 5.9 MPa, about 3.9 to about 5.6 MPa; about 4.2 to about 6.8 MPa, about 4.2 to about 6.5 MPa, about 4.2 to about 6.2, MPa about 4.2 to about 5.9 MPa, or about 4.2 to about 5.6 MPa, at a shear rate of 20 s$^{-1}$ and a temperature of 190° C. In addition to a melting pressure of 1.7 to 7.0 MPa, the EVOH resin composition can, in some cases, contain a boron compound and/or boron acid and/or cinnamic acid and/or alkali metal and/or conjugated polyene and/or lubricant and/or alkali earth metal. The substances described above may lead to better properties in the EVOH resin composition.

The EVOH resin composition may have a melting force of about 0.04 to about 2.4 kN at a shear rate of 20 s$^{-1}$ and a temperature of 190° C. For example, the melting force may be about 0.04 to about 2.4 kN, about 0.04 to about 2.0 kN, about 0.04 to about 1.7 kN, about 0.04 to about 1.4 kN, about 0.04 to about 1.1 kN, about 0.04 to about 1.0 kN, about 0.04 to about 0.8 kN; about 0.06 to about 2.4 kN, about 0.06 to about 2.0 kN, about 0.06 to about 1.7 kN, about 0.06 to about 1.4 kN, about 0.06 to about 1.1 kN, about 0.06 to about 1.0 kN, about 0.06 to about 0.8 kN; about 0.08 to about 2.4 kN, about 0.08 to about 2.0 kN, about 0.08 to about 1.7 kN, about 0.08 to about 1.4 kN, about 0.08 to about 1.1 kN, about 0.08 to about 1.0 kN; about 0.1 to about 2.4 kN, about 0.1 to about 2.0 kN, about 0.1 to about 1.7 kN, about 0.1 to about 1.4 kN, about 0.1 to about 1.1 kN, at a shear rate of 20 s$^{-1}$ and a temperature of 190° C.

According to an aspect of the disclosure, provided is EVOH resin composition having fluorine-containing microparticles and a boron content of 10 to 450 ppm. Without being limited to any specific theory, it is believed that the addition of a boron compound in EVOH resin composition having fluorine-containing micro-particles, such that the boron content of the EVOH is from 10 to 450 ppm, reduces or eliminates the sticking of the EVOH resin composition during extrusion through a screw extruder and further improves the film thickness uniformity and flexibility. In some instances, such EVOH resin compositions may clean the screw extruder during the extrusion process by removing or at least partially removing EVOH resin previously stuck to the inner surfaces of the screw extruder.

A typical EVOH resin composition may comprise an ethylene-vinyl alcohol copolymer; one or more fluorine-containing micro-particles; and a boron compound, where the ethylene-vinyl alcohol copolymer resin composition has a boron content of 10 to 450 ppm. In some instances, the EVOH resin composition may have a boron content of 10 to 450 ppm, 10 to about 400 ppm, 10 to about 350 ppm, 10 to about 300 ppm, 10 to about 275 ppm, 10 to about 250 ppm, 10 to about 225 ppm, 10 to about 200 ppm, 10 to about 175 ppm; about 20 to 450 ppm, about 20 to about 400 ppm, about 20 to about 350 ppm, about 20 to about 300 ppm, about 20 to about 275 ppm, about 20 to about 250 ppm, about 20 to about 225 ppm, about 20 to about 200 ppm, about 20 to about 175 ppm; about 60 to 450 ppm, about 60 to about 400 ppm, about 60 to about 350 ppm, about 60 to about 300 ppm, about 60 to about 275 ppm, about 60 to about 250 ppm, about 60 to about 225 ppm, about 60 to about 200 ppm, about 60 to about 175 ppm; about 100 to 450 ppm, about 100 to about 400 ppm, ppm, about 100 to about 350 ppm, about 100 to about 300 ppm, about 100 to about 275 ppm, about 100 to about 250 ppm, about 100 to about 225 ppm, about 100 to about 200 ppm, about 100 to about 175 ppm; about 140 to 450 ppm, about 140 to about 400 ppm, about 140 to about 350 ppm, about 140 to about 300 ppm, about 140 to about 275 ppm, about 140 to about 250 ppm, about 140 to about 225 ppm, about 140 to about 200 ppm; about 180 to 450 ppm, about 180 to about 400 ppm, about 180 to about 350 ppm, about 180 to about 300 ppm, about 180 to about 275 ppm, about 180 to about 250 ppm, about 180 to about 225 ppm; about 220 to 450 ppm, about 220 to about 400 ppm, about 220 to about 350 ppm, about 220 to about 300 ppm, about 220 to about 275 ppm, based on the total weight of the EVOH resin composition. When the boron content of EVOH resin composition is within a certain range, it can increase the viscosity of the EVOH resin composition and reduce the chance of the EVOH resin composition sticking to the screw, or remove the EVOH on the screw, so that the material has a self-cleaning function, which further improving the film thickness uniformity. The inventors surprisingly discovered that as long as the EVOH resin composition 100 of the instant disclosure, which contains the fluorine-containing micro-particles 110, has the desired ranges of boron content, the processability, the mechanical properties, and the uniformity of film thickness are improved. In addition to a boron content of 10 to 450 ppm, the EVOH resin composition can, in some cases, contain cinnamic acid, alkali metal, conjugated polyene, lubricant, alkali earth metal, salts thereof, and/or mixtures thereof. The substances described above are common substance usually existing in the EVOH resin composition leading to better properties.

In an aspect of the present invention, the boron content is controlled to be within a specific range with the presence of a fluoropolymer. In addition to improving the flexibility and processing characteristics of EVOH, it can further improve the appearance characteristics of the final product.

The boron compounds may, in some instances, include boric acid or a metal salt thereof. Examples of the metal salt include, but are not limited to, calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (I) borate, manganese metaborate, manganese tetraborate), lithium borate (e.g. lithium metaborate, lithium tetraborate, lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

According to another aspect of the disclosure, provided is an EVOH film formed from the EVOH resin composition 100 thereof. The EVOH film has a Charpy impact strength of at least 2.3 KJ/m$^2$ according to ISO 179-1 at a temperature 23° C. and an elongation at break of at least 17.8% according to ISO 527-2 at a temperature of 23° C. For some embodiments, the EVOH film may have a Charpy impact strength of at least 2.5 KJ/m$^2$, at least 3 KJ/m$^2$, at least 4.5 KJ/m$^2$, at least 5.5 KJ/m$^2$, or at least 6.5 KJ/m$^2$ according to ISO 179-1 at a temperature 23° C. For obtaining the above Charpy impact strength values, the test specimens should be maintained at a relative humidity of 50%±5% and a temperature of 23° C.±2° C. for 16 hours before being testing using the ISO 179-1 procedure. Additionally, the impact energy should be set to 7.5 J, the impact direction should be edgewise, the specimen type should be 1 eA, the average width of the specimen should be 10.06 mm, and the average thickness of the specimen should be 3.94 mm. The depth of the notch for testing should be 8.09 mm, the testing temperature should be 23° C.±2° C., and the fracture type should be C. The EVOH film may have an elongation breakage percentage of at least 18% according to ISO 527-2 at a temperature of 23° C. In some instances, the EVOH film has an elongation breakage percentage of at least 20%, at least 21%, at least 22%, at least 23%, or at least 24% according to ISO 527-2 at a temperature of 23° C. For obtaining the above values for the elongation at break, the testing method edition should be 2012, the testing speed 50 mm/min, the specimen type should be 1A, and the average thickness of the specimen should be 3.99 mm.

In accordance with yet another aspect of the disclosure, provided is a multi-layer structure having at least one layer formed from the EVOH resin composition disclosed herein; at least one polymer layer; and at least one adhesive layer. The polymer layer may be chosen from a low density polyethylene layer, a polyethylene-graft-maleic-anhydride layer, a polypropylene layer, a nylon layer, and a combination thereof. The adhesive layer may be a tie layer. The tie layer may be e.g., ARKEMA OREVAC 18729, which is available from ARKEMA.

EXAMPLES

The following non-limiting examples of aspects of the invention are provided primary for the purpose of elucidating aspects of the invention and the benefits derived therefrom.

Example 1

Four fluoropolymers (Example Fluoropolymers A-D) were prepared according to aspects of the disclosure. Example Fluoropolymers A-D were subsequently used for producing ethylene vinyl alcohol copolymer (hereafter "EVOH") resin composition according to the instant disclosure. Although Example Fluoropolymers A-D were prepared according to the specific process disclosed below, other types of fluoropolymers may be used for addition with the EVOH.

Example Fluoropolymer A

Example Fluoropolymer A was produced using an autoclave as batch reactor. The autoclave had an internal volume of about 20 liters and was equipped with an electromagnetic induction stirrer. The autoclave was sufficiently scavenged with nitrogen gas ($N_2$) and was subsequently filled with reduced pressure nitrogen gas five times.

While applying a reduced pressure within the autoclave, 6,960 grams (g) of deoxygenated pure water, 3,204 g of 1,1,2-trichloro-1,2,2-trifluoroethane, and 3.5 g of methylcellulose was added into the autoclave. The methylcellulose had a viscosity of 50 cp and was stirred into the composition within the autoclave at 450 rpm to act as a suspension stabilizer. The composition within the autoclave was kept at a temperature of 52° C.

A monomer composed of 25.3 wt. % of vinylidene fluoride (VDF), 68.6 wt. % of hexafluoropropylene (HFP), 6.1 wt. % of tetrafluoroethylene (TFE), was mixed into the batch as a charging gas, and charged to 10 kg/cm$^2$. Subsequently, 45.6 g of a solution of about 90 wt. % of 1,1,2-trichloro-1,2,2-trifluoroethane and 10 wt. % of diisopropyl peroxydicarbonate was charged as a catalyst to initiate polymerization. The diisopropyl peroxydicarbonate acted as an initiator for initiating polymerization. Because the pressure is reduced during the polymerization reaction, a mixed monomer having 44.7 wt. % of VDF, 32.5 wt. % of HFP, and 22.8 wt. % of TFE was added to increase the pressure back up to 10 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 7.5 kg of Example Fluoropolymer A.

Example Fluoropolymer B

Example Fluoropolymer B was produced using a similar autoclave and set up as used to produce Example Fluoropolymer A. The autoclave was also repeatedly filled with reduced pressure-$N_2$ five times.

While applying a reduced pressure within the autoclave, 7200 g of deoxygenated pure water, 3250 g of 1,1,2-trichloro-1,2,2-trifluoroethane and 4 g of methylcellulose was added into the autoclave. The methylcellulose had a viscosity of 50 cp and was stirred into the batch within the autoclave at 500 rpm to act as a suspension stabilizer. The batch within the autoclave was kept at a temperature of 52° C.

A monomer composed of 25 wt. % of VDF, 55 wt. % of HFP, and 20 wt. % of TFE was used as a charging gas, and charged to 20 kg/cm$^2$. Subsequently, 40 g of a solution of about 85 wt. % 1,1,2-trichloro-1,2,2-trifluoroethane and 15 wt. % of diisopropyl peroxydicarbonate was charged as a catalyst to initiate polymerization. The diisopropyl peroxydicarbonate acted as an initiator for initiating polymerization. Because the pressure was reduced during the polymerization reaction, a mixed monomer of 40 wt. % of VDF, 35 wt. % of HFP, and 25 wt. % of TFE was added to increase the pressure back up to 20 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 6 kg of Example Fluoropolymer B.

Example Fluoropolymer C

Example Fluoropolymer C was produced using an autoclave and an induction stirrer that were similar to those used to produce Example Fluoropolymer A. The autoclave was sufficiently scavenged with nitrogen gas, and charged with 3 liters of a composition of deoxidized purified water and 30 g of ammonium perfluorodecanoate, which acted as emulsifier. The composition within the autoclave was heated to 60° C. and stirred at 380 rpm.

The autoclave was then charged with a gas mixture of about 70 wt. % of VDF and about 30 wt. % of HFP until the internal pressure of the autoclave reached 20 kg/cm$^2$. Subsequently, 40 g of a solution contain about 80 wt. % of 1,1,2-trichloro-1,2,2-trifluoroethane and 20 wt. % of diisopropyl peroxydicarbonate was added into the autoclave using nitrogen. The diisopropyl peroxydicarbonate acted as an initiator for initiating polymerization.

The internal pressure within the autoclave was maintained at 20 kg/cm$^2$ during polymerization by successively injecting a gas mixture of VDF (62 wt. %) and HFP (38 wt. %). Because the polymerization rate decreased along with the progress of polymerization, an additional 30 g of solution containing about 80 wt. % of a 1,1,2-trichloro-1,2,2-trifluoroethane solution and 20 wt. % of diisopropyl peroxydicarbonate was injected using nitrogen gas 3 hours after the initiation of the polymerization reaction. The monomers were polymerized for an additional 3 hours and the resulting suspension was dehydrated with a centrifugal separator, washed with DI water, and then vacuum dried at 100° C. to obtain about 7.2 kg of Example Fluoropolymer C.

Example Fluoropolymer D

Example Fluoropolymer D was produced using an autoclave having a volume of about 3 liter, which served as a batch reactor. The autoclave had an electromagnetic induction stirrer. A batch of 936 g of DI water, 0.36 g of methylcellulose, 360 g of VDF, 0.3 g of tert-butylperoxyprivalate, 0.36 g of sodium pyrophosphate, 0.36 g of acidic sodium pyrophosphate, and 1.8 g of diethyl carbonate was charged and added into the autoclave. The batch was stirred at 10° C. for 30 minutes, and then warmed to 45° C. for 140 minutes.

The maximum pressure within the autoclave was 6 MPa. The polymerization of the monomers was terminated when the pressure in the autoclave was reduced to 2.5 MPa, which occurred 15 hours after the initial warming of the monomers. After the polymerization was completed, the polymer slurry was withdrawn, dehydrated, washed with DI water, dehydrated and then dried at 80° C. for 24 hours to obtain a vinylidene fluoride polymer (Example Fluoropolymer D) having an inherent viscosity of 2.05 dl/g and a bulk density of 0.225 g/ml at a yield of 55%.

Example 2

A non-limiting, exemplary method for preparing EVOH resin compositions and pellets formed therefrom is provided below. The EVOH resin compositions and pellets thereof contained a boron content and fluoro micro-particles. Specifically, eighteen exemplary EVOH resin compositions (Example EVOH 1-18) and eleven comparative EVOh resin compositions (Comparative EVOH 1-11) were prepared according to methods similar to the method disclosed below. However, the specific methods for producing EVOH 1-18 and Comparative EVOH 1-11 typically varied from the method disclosed below in one or more ways.

Ethylene-vinyl acetate copolymer with an ethylene content of 29%, by mole, underwent saponification by 99.5% to produce EVOH polymers. Subsequently, the EVOH polymers were dissolved into a solution comprising methanol and water in a weight ratio of 70:30. After dissolving the EVOH polymers into the solution of methanol and water, the solution had a 41 wt. % solid content of EVOH polymers. The solution was maintained at a temperature of 60° C.

The solution of methanol, water, and EVOH was subsequently pelletized using underwater pelletization. Specifically, the solution of methanol, water, and EVOH was pumped into a feeding tube with a flow rate of 120 L/min. The solution was transferred to an inlet pipe, which had a diameter of 2.8 mm, and then cut by a rotating knife at a speed of 1,500 rpm. The EVOH were cooled by adding water having a temperature of 5° C. The EVOH were subsequently centrifuged to separate the EVOH pellet into particles. The separated EVOH particles were washed with water, dipped into a boric acid solution and stirred, and then dried to obtain an EVOH pellet.

The EVOH pellet was blended with a fluoropolymer, e.g., such as those discussed in Example 1, at certain ratios and then transferred into a twin-screw extruder. The twin-screw extruder had different temperatures along thirteen zones, as summarized in Table 1, below. In Table 1, "EV27" refers to an EVOH having an ethylene content of 27 mole %, "EV29" refers to an EVOH having an ethylene content of 29 mole %, "EV32" refers to an EVOH having an ethylene content of 32 mole %, "EV38" refers to an EVOH having an ethylene content of 38 mole %, and "EV44" refers to an EVOH having an ethylene content of 44 mole %.

TABLE 1

| EVOH | zone 1 | zone 2 | zone 3 | zone 4 | zone 5 | zone 6 | zone 7 | zone 8 | zone 9 | zone 10 | zone 11 | zone 12 | zone 13 |
|---|---|---|---|---|---|---|---|---|---|---|---|---|---|
| EV27 | 190 | 190 | 195 | 195 | 195 | 200 | 200 | 205 | 205 | 210 | 210 | 215 | 215 |
| EV29 | 190 | 190 | 195 | 195 | 195 | 200 | 200 | 205 | 205 | 205 | 210 | 210 | 215 |
| EV32 | 185 | 185 | 190 | 190 | 190 | 195 | 195 | 200 | 200 | 205 | 205 | 210 | 210 |
| EV38 | 175 | 175 | 185 | 185 | 185 | 195 | 195 | 195 | 200 | 200 | 205 | 205 | 205 |
| EV44 | 170 | 170 | 170 | 170 | 175 | 175 | 180 | 180 | 180 | 185 | 185 | 190 | 195 |

Example 3

Example EVOH 1-18 and Comparative EVOH 1-11 were each formed into a film according to the method described below. Films were produced by feeding Example EVOH 1-18 and Comparative EVOH 1-11 into a single layer T-die cast film extruder (Optical Control System MEV4). The films formed from Example EVOH 1-18 and Comparative EVOH 1-11 each had a thickness of 20 μm. The temperature of the extruder was set to 220° C., while the temperature of the tie was set to 230° C. The rotational frequency of the screw was 7 rotations/minutes (rpm).

Example 4

Eighteen non-limiting, exemplary EVOH resin composition containing fluoro micro-particles (Example EVOH 1-18) and eleven comparative EVOH resin composition (Comparative EVOH 1-11) were prepared according to methods similar to those discussed in Example 2. Table 2, shown below, provides a summary of certain attributes, namely, the ethylene content of the EVAC, the specific fluoropolymer incorporated into the EVOH, the amount of such fluoropolymer, and the boron content, of Example EVOH 1-18 and Comparative EVOH 1-11.

TABLE 2

| | Ethylene Content of EVAC (mole %) | Example Fluoropolymer No. | Amount of added Fluoropolymer (wt. %) | Concentration of boron acid (wt %) | Dipping time (hr) |
|---|---|---|---|---|---|
| Example EVOH 1 | 29 | A | 1 | 0.25 | 12 |
| Example EVOH 2 | 29 | A | 2 | 0.13 | 12 |
| Example EVOH 3 | 29 | A | 5 | 0.12 | 20 |
| Example EVOH 4 | 29 | A | 0.1 | 0.07 | 12 |
| Example EVOH 5 | 29 | A | 5 | 0.02 | 14 |
| Example EVOH 6 | 29 | A | 5 | 0.6 | 12 |
| Example EVOH 7 | 29 | A | 0.1 | 0.18 | 16 |
| Example EVOH 8 | 29 | A | 0.1 | 0.4 | 12 |
| Example EVOH 9 | 44 | A | 0.1 | 0.06 | 20 |
| Example EVOH 10 | 44 | A | 5 | 0.02 | 20 |
| Example EVOH 11 | 32 | B | 0.5 | 0.12 | 12 |
| Example EVOH 12 | 32 | B | 1 | 0.12 | 20 |

TABLE 2-continued

| | Ethylene Content of EVAC (mole %) | Example Fluoro-polymer No. | Amount of added Fluoro-polymer (wt. %) | Concentration of boron acid (wt %) | Dipping time (hr) |
|---|---|---|---|---|---|
| Example EVOH 13 | 32 | B | 2 | 0.06 | 20 |
| Example EVOH 14 | 32 | B | 3 | 0.02 | 16 |
| Example EVOH 15 | 32 | C | 1 | 0.12 | 14 |
| Example EVOH 16 | 29 | D | 3 | 0.18 | 12 |
| Example EVOH 17 | 44 | D | 2 | 0.24 | 20 |
| Example EVOH 18 | 29 | A | 8 | 0.12 | 19 |
| Comparative EVOH 1 | 29 | — | 0 | 0.72 | 10 |
| Comparative EVOH 2 | 29 | — | 0 | 0.13 | 12 |
| Comparative EVOH 3 | 29 | — | 0 | 0 | 0 |
| Comparative EVOH 4 | 29 | A | 5 | 0 | 0 |
| Comparative EVOH 5 | 29 | A | 8 | 0.012 | 6 |
| Comparative EVOH 6 | 29 | A | 8 | 0.72 | 12 |
| Comparative EVOH 7 | 29 | A | 5 | 0.72 | 12 |
| Comparative EVOH 8 | 29 | A | 5 | 0 | 0 |
| Comparative EVOH 9 | 44 | — | 0 | 0.8 | 12 |
| Comparative EVOH 10 | 44 | A | 8 | 0.012 | 10 |
| Comparative EVOH 11 | 44 | A | 8 | 0.8 | 10 |

Example EVOH 1-18 and Comparative EVOH 1-11 were assessed to determine the amount of boron content. A sample solution of each of Example EVOH 1-18 and Comparative EVOH 1-11 was prepared by breaking down 0.1 g of each EVOH resin compositions in concentrated nitric acid while applying microwaves. The sample solution was then diluted with pure water to adjust the concentration to 0.75 mg/ml. The boron amount contained in the prepared solution was measured using of inductively coupled plasma ("ICP") emission spectrochemical analysis (ICP-OES) with a Thermo iCAP7000 analyzer. The boron amount, as a measurement value, corresponds to the amount of boron derived from the boron compound used.

Example EVOH 1-18 and Comparative EVOH 1-11 were assessed to determine the boron content and melting point temperatures of Example EVOH 1-18 and Comparative EVOH 1-11 in accordance with the procedures described above. Films were formed from Example EVOH 1-18 and Comparative EVOH 1-11 in accordance with methods similar to that described in Example 3. The films of Example EVOH 1-18 and Comparative EVOH 1-11 were then assessed to determine the uniformity of film thickness, die precipitation, appearance (the number of fisheyes) of such films, the Charpy impact strength of the films, and the elongation breakage of the films using the procedures and the qualitative valuation metrics discussed below. A summary of the properties of the films of Example EVOH 1-18 and Comparative EVOH 1-11 is provided below in Table 3.

TABLE 3

| | Boron Content (ppm) | $1^{st}$ Melting Point Temp. (C°) $2^{nd}$ melting Point Temp. (C°) | Uniformity of Film Thickness | Die Precipitation | Number of fisheyes | Charpy impact Strength (KJ/m$^2$) | Elongation Breakage (%) |
|---|---|---|---|---|---|---|---|
| Example EVOH 1 | 210.6 | 121.3 / 186.7 | ○ | ○ | <3 | 2.52 | 18.4 |
| Example EVOH 2 | 110.5 | 122.5 / 186.8 | ○ | ○ | <3 | 3.2 | 20.1 |
| Example EVOH 3 | 160.3 | 125.2 / 186 | ○ | ○ | <3 | 4 | 23.2 |
| Example EVOH 4 | 60 | 124 / 186.5 | ○ | ○ | <3 | 2.5 | 18 |
| Example EVOH 5 | 20 | 125.1 / 186.2 | ○ | ○ | <3 | 3.55 | 20.5 |
| Example EVOH 6 | 450 | 125.6 / 186.3 | ○ | ○ | 3-10 | 4.5 | 24.5 |
| Example EVOH 7 | 180 | 124 / 186.3 | ○ | ○ | <3 | 2.6 | 18.2 |
| Example EVOH 8 | 350 | 124.3 / 186.3 | ○ | ○ | <3 | 2.6 | 18.3 |
| Example EVOH 9 | 56.8 | 134.7 / 164.6 | ○ | ○ | <3 | 2.63 | 19.8 |
| Example EVOH 10 | 20.8 | 122.5 / 164.5 | ○ | ○ | <3 | 6.5 | 24.6 |
| Example EVOH 11 | 95.5 | 130.2 / 182 | ○ | ○ | <3 | 2.54 | 18.2 |
| Example EVOH 12 | 150 | 119.5 / 183 | ○ | ○ | <3 | 2.85 | 19.2 |
| Example EVOH 13 | 80.5 | 114.2 / 182.5 | ○ | ○ | <3 | 3.15 | 21.6 |
| Example EVOH 14 | 20.8 | 116.4 / 182.2 | ○ | ○ | <3 | 3.6 | 22.3 |
| Example EVOH 15 | 110.7 | 120.7 / 182.2 | ○ | ○ | <3 | 3.06 | 20.4 |
| Example EVOH 16 | 149.1 | 133.6 / 186.3 | ○ | ○ | <3 | 3.3 | 23.1 |
| Example EVOH 17 | 240.3 | 133.2 / 164.3 | ○ | ○ | <3 | 2.9 | 22.8 |

TABLE 3-continued

| | Boron Content (ppm) | 1$^{st}$ Melting Point Temp. (C°) 2$^{nd}$ melting Point Temp. (C°) | Uniformity of Film Thickness | Die Precipitation | Number of fisheyes | Charpy impact Strength (KJ/m$^2$) | Elongation Breakage (%) |
|---|---|---|---|---|---|---|---|
| Example EVOH 18 | 150 | 121 187.7 | ○ | ○ | 3-10 | 2.7 | 19 |
| Comparative EVOH 1 | 550 | NA 187 | ○ | X | >10 | 2.3 | 17.5 |
| Comparative EVOH 2 | 100 | NA 188.2 | ○ | X | >10 | 2.2 | 17.1 |
| Comparative EVOH 3 | 0 | NA 187 | X | X | 3-10 | 2.25 | 17.1 |
| Comparative EVOH 4 | 0 | 125.1 186.3 | X | ○ | <3 | 3.62 | 20.2 |
| Comparative EVOH 5 | 5 | 123 187.5 | X | ○ | 3-10 | 2.7 | 18.9 |
| Comparative EVOH 6 | 560.5 | 120 187.7 | ○ | ○ | >10 | 2.8 | 19.2 |
| Comparative EVOH 7 | 530 | 125.5 186.3 | ○ | ○ | >10 | 4.6 | 24.8 |
| Comparative EVOH 8 | 0 | 125.1 186.3 | X | ○ | <3 | 3.62 | 20.2 |
| Comparative EVOH 9 | 550 | NA 165.5 | ○ | X | >10 | 2.71 | 21.8 |
| Comparative EVOH 10 | 5 | 129.5 165.2 | X | ○ | >10 | 5.3 | 23.3 |
| Comparative EVOH 11 | 530 | 128.6 164.8 | ○ | ○ | >10 | 5.15 | 23.3 |

The uniformity of the film thickness was assessed by setting a first point as the center point, setting a second point 4 cm from the first point in a first direction, and setting a third point 4 cm from the first point in a direction opposed the second point. The thickness was then determined at the first point, second point, and third point. Based on the determined thicknesses of the first point, second point, and third point, the deviation in the thickness of the film was evaluated using the following formulas, where the first is referred to as "A," the second point is referred as "B," and the third point is referred to as "C."

$$\Delta T_{ab} = |(A-B)|/(A \text{ or } B)_{minor\ one}$$

$$\Delta T_{bc} = |(B-C)|/(B \text{ or } C)_{minor\ one}$$

$$\Delta T_{ac} = |(A-C)|/(A \text{ or } C)_{minor\ one}$$

If each of the above deviations in thickness was less than or equal to 5%, then the film had an excellent thickness deviation and was given an "0." If one or more of the deviations in thickness was greater than 5% then the film had moderate thickness deviation and was given a "X."

For the appearance of the films formed from Example EVOH 1-18 and Comparative EVOH 1-11, the number of fisheyes was graded at three levels:

(1) the number of fisheyes having a size greater than 200 μm within a square meter of the film was less than 3;
(2) the number of fisheyes having a size greater than 200 μm within a square meter was 3 to 10; and
(3) the number of fisheyes having a size greater than 200 μm within a square meter was greater than 10.

The number of fisheyes was tested using a charged coupled device (CCD) sensor and FSA-100 devising using FSA-100 V.8 software. Additionally, an "O" was given if no precipitation at the die was exhibited and a "X" was given if precipitation at the die was exhibited.

For the Charpy impact strength values, the test specimens were maintained at a relative humidity of 50%±5% and a temperature of 23° C.±2° C. for 16 hours before being testing using the ISO 179-1 procedure. The applied impact energy was 7.5 J, the impact direction was edgewise, the average width of the specimen was 10.06 mm, and the average thickness of the specimen was 3.94 mm. The depth of the notch was 8.09 mm, the testing temperature was 23° C.±2° C., and the fracture type was C.

For the elongation at break, the testing method was according to ISO 527-2 at a temperature of 23° C. and the edition was 2012, the testing speed was 50 mm/min, the specimen type was 1A, and the average thickness of the specimen was 3.99 mm.

The melting point temperatures of the Example EVOH 1-18 and Comparative EVOH 1-11 was determined using a TA-Q200 differential scanning calorimeter (DSC), manufactured by TA instruments, according to the procedure of ISO 11357-3 (2011), utilizing the 1$^{st}$ melting point temperature and 2$^{nd}$ melting point temperature from the first run of thermoscan by DSC.

From the data showed in table 3, it is surprisingly found that if the boron content is within the desired range and the EVOH resin composition contains fluorine as discussed above, the flexibility, mechanical property, film thickness uniformity and film appearance are improved. The boron content of Comparative EVOH 1, 6-7, 9, and 11 is more than 450 ppm leading to the poor film appearance which with more than 10 fisheyes within a square meter. Comparative EVOH 2 showed that if no flouoropolymer existing in the EVOH resin composition the flexibility, mechanical properties, and die precipitation are not improved. Comparative 3-5, 8, and 10 showed that if the boron content are zero or small, the uniformity of film thickness are poor.

Example EVOH 1-5 and 7-17 and Comparative EVOH 1-11 were further assessed to determine the range of microparticle sizes, fluorine content, dispersion of microparticles of Example EVOH 1-5 and 7-17 and Comparative EVOH 1-11 in accordance with the procedures described below. Films were formed from Example EVOH 1-5 and 7-17 and Comparative EVOH 1-11 in accordance with methods similar to that described in Example 3. The films of Example EVOH 1-5 and 7-17 and Comparative EVOH 1-11 were then assessed to determine the appearance (the number of fisheyes) of such films. A further summary of the properties of the films of Example EVOH 1-5 and 7-17 and Comparative EVOH 1-11 is provided below in Table 4.

TABLE 4

|  | Particle Size Range (μm) | Fluorine Content (wt %) | Dispersion | Numbers of fisheye |
|---|---|---|---|---|
| Example EVOH 1 | 1.2~5 | 3.5~41 | 0 | <3 |
| Example EVOH 2 | 1.6~8 | 8~44 | 0 | <3 |
| Example EVOH 3 | 1.2~17 | 8~40 | 0 | <3 |
| Example EVOH 4 | 0.5~5 | 1.8~12 | 0 | <3 |
| Example EVOH 5 | 1.5~18 | 9~43 | 0 | <3 |
| Example EVOH 7 | 0.5~6 | 1.7~12 | 0 | <3 |
| Example EVOH 8 | 0.3~6 | 1.7~13.5 | 0 | <3 |
| Example EVOH 9 | 0.6~3 | 1.5~10.5 | 0 | <3 |
| Example EVOH 10 | 3~13 | 11~40.6 | 0 | <3 |
| Example EVOH 11 | 1.2~7 | 2.2~30 | 0 | <3 |
| Example EVOH 12 | 1.4~8 | 3.9~43 | 0 | <3 |
| Example EVOH 13 | 1.5~9 | 4.2~47 | 0 | <3 |
| Example EVOH 14 | 1.6~10 | 5~47 | 0 | <3 |
| Example EVOH 15 | 1.6~10 | 4.5~40 | 0 | <3 |
| Example EVOH 16 | 0.6~2.5 | 2~25 | 0 | <3 |
| Example EVOH 17 | 0.8~2.8 | 1.6~22 | 0 | <3 |
| Comparative EVOH 1 | NA | 0 | X | <10 |
| Comparative EVOH 2 | NA | 0 | X | <10 |
| Comparative EVOH 3 | NA | 0 | X | <10 |
| Comparative EVOH 4 | 1.5~18 | 9~43 | 0 | <3 |
| Comparative EVOH 5 | 1~40 | 17~48.8 | X | <10 |
| Comparative EVOH 6 | 3~45 | 16~48.5 | X | <10 |
| Comparative EVOH 7 | 1~17 | 8~41 | 0 | <10 |
| Comparative EVOH 8 | 1.5~18 | 9~43 | 0 | <3 |
| Comparative EVOH 9 | NA | 0 | X | <10 |
| Comparative EVOH 10 | 0.8~40 | 13~45 | X | <10 |
| Comparative EVOH 11 | 0.6~41 | 12~44 | X | <10 |

To assess the degree of dispersion of the micro-particles within Example EVOH 1-5 and 7-17 and the Comparative EVOH 1-11 (if any), at one EVOH pellet from Example EVOH 1-5 and 7-17 and Comparative EVOH 1-11 was cut to produce a specimen with a thickness of 0.5 mm. The cut surface of each specimen EVOH pellet was then assessed using an optical microscope (a LEICA DM2700M optical microscope sold by LEICA MICROSYSTEMS), a CCD Camera (such as those produced by LEICA MICROSYSTEMS), and analyzed with software (e.g., LAS V4.11 software). The software (e.g., LAS V4.11 software) determined the length of the cross-sectional area of each of the fluorine containing micro-particles. A "X" was given to the EVOH pellet(s) if one or more micro-particles had a particle size with a diameter or a length of the major axis that is larger than 20 μm or if no micro-particles were formed, while a "0" was given if excellent dispersion was exhibited without agglomeration.

The fluorine content was determined using a Model JSM-6390 scanning electron microscope, produced by Jeol USA Inc., which was set to a voltage of 15 KV, with a working distance 15 mm. Energy dispersive spectroscopy analysis was completed using an Oxford Instrument INCA 7582. The spot size of the scanning electron microscope was adjusted to make the dead time of the energy dispersive spectroscopy less than 35%. The acquisition rate for the energy dispersive spectroscopy analysis was set to 1 Kcps. Using the measurements obtained from the scanning electron microscope and energy dispersive spectroscopy, the fluorine content was calculated as a wt. % based on the total content of carbon, oxygen, and fluorine using the element signal peaks of $k_\alpha 0.2774$ keV for carbon, $k_\alpha 0.5249$ keV for oxygen, and $k_\alpha 0.6768$ keV for fluorine. Additionally, the scanning electron microscope was specifically aimed to the micro-particles during the energy dispersive spectroscopy so that the fluorine content primarily reflects the fluorine in the micro-particles. Specifically, each of Example EVOH 1-5 and 7-17 and the Comparative EVOH 1-11 were evaluated in ten places.

As shown in Table 4, the films formed from Example EVOH 1-5 and 7-17, which further contained a preferable particle size range, each exhibited excellent film appearance with less than three fisheyes within a square meter and excellent die precipitation.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition comprising:
   an ethylene-vinyl alcohol copolymer;
   one or more fluorine-containing particles; and
   a boron compound, wherein the ethylene-vinyl alcohol copolymer resin composition has a boron content of 10 to 450 ppm.

2. The ethylene-vinyl alcohol copolymer resin composition of claim 1, further comprising:
   at least two melting point temperatures, a first melting point temperature and a second melting point temperature.

3. The ethylene-vinyl alcohol copolymer resin composition of claim 2, wherein the first melting point temperature is from about 100° C. to about 140° C.

4. The ethylene-vinyl alcohol copolymer resin composition of claim 2, wherein the second melting point temperature is from about 150° C. to about 195° C.

5. The ethylene-vinyl alcohol copolymer resin composition of claim 1, wherein the one or more fluorine-containing particles comprise a fluorinated polymer.

6. The ethylene-vinyl alcohol copolymer resin composition of claim 1, wherein the fluorine-containing particles comprise about 1.5 to 47 wt. % of fluorine, based on the total weight of carbon, oxygen and fluorine elements.

7. The ethylene-vinyl alcohol copolymer resin composition of claim 1, wherein the fluorine-containing particles each have a particle size with a diameter or a length of the major axis that is not greater than 20 μm.

8. The ethylene-vinyl alcohol copolymer resin composition of claim 7, wherein the fluorine-containing particles each have a particle size with a diameter or a length of the major axis that is 0.3 to about 18 μm.

9. The ethylene-vinyl alcohol copolymer resin composition of claim 1, wherein the ethylene-vinyl alcohol copolymer resin composition has a boron content of 20 to 350 ppm.

10. A film comprising the ethylene-vinyl alcohol of claim 1, wherein the film has a Charpy impact strength of at least 2.5 KJ/m$^2$ according to ISO 179-1 at 23° C. and an elongation at break of at least 18% according to ISO 527-2 at 23° C.

11. The film of claim 10, wherein the film has an elongation at break of at least 20%.

12. A multi-layer structure comprising:
   (a) at least one layer formed from the ethylene-vinyl alcohol copolymer resin of claim 1;
   (b) at least one polymer layer; and
   (c) at least one adhesive layer.

13. The multi-layer structure of claim 12, wherein the polymer layer is selected from the group consisting of a low density polyethylene layer, a polyethylene-graft-maleic-anhydride layer, a polypropylene layer, a nylon layer, and a combination thereof.

* * * * *